US007156997B2

(12) United States Patent
Marsh et al.

(10) Patent No.: US 7,156,997 B2
(45) Date of Patent: Jan. 2, 2007

(54) PACKAGE ASSEMBLY FOR PIPERAZINE-BASED MEMBRANES

(75) Inventors: Allyn R. Marsh, Eden Prairie, MN (US); Russ Schaffenberg, Bloomington, MN (US); Steven D. Jons, Eden Prairie, MN (US); Roy A. Davis, Midland, MI (US)

(73) Assignees: Dow Global Technologies Inc., Midland, MI (US); Filmtec Corporation, Minneapolis, MN (US)

( * ) Notice: Subject to any disclaimer, the term of this patent is extended or adjusted under 35 U.S.C. 154(b) by 130 days.

(21) Appl. No.: 09/972,650

(22) Filed: Oct. 5, 2001

(65) Prior Publication Data

US 2003/0098272 A1    May 29, 2003

(51) Int. Cl.
B01D 63/10    (2006.01)
B01D 61/02    (2006.01)
B01D 63/00    (2006.01)

(52) U.S. Cl. .................. 210/500.38; 210/650; 210/652; 210/500.21; 210/500.37; 210/501; 210/321.85; 436/18

(58) Field of Classification Search ........... 210/500.21, 210/500.38, 500.37, 650–654, 490, 501, 210/502.1; 436/18, 177, 808, 828; 427/244, 427/333
See application file for complete search history.

(56) References Cited

U.S. PATENT DOCUMENTS

| | | | |
|---|---|---|---|
| 3,687,842 A | 8/1972 | Credali et al. | 210/23 |
| 3,696,031 A | 10/1972 | Credali et al. | 210/23 |
| 4,157,960 A | 6/1979 | Chang et al. | 210/23 R |
| 4,259,183 A | 3/1981 | Cadotte | 210/654 |
| 4,277,344 A | 7/1981 | Cadotte | 210/654 |
| 4,293,420 A | 10/1981 | Applegate et al. | 210/500.2 |
| 4,675,159 A * | 6/1987 | Al-Sioufi | 422/36 |
| 4,723,603 A | 2/1988 | Plummer | 166/275 |
| 4,758,343 A | 7/1988 | Sasaki et al. | 210/500.28 |
| 4,769,148 A | 9/1988 | Fibiger et al. | 210/500.38 |
| 4,857,363 A | 8/1989 | Sasaki et al. | 427/245 |
| 4,859,384 A | 8/1989 | Fibiger et al. | 264/45.1 |
| 5,057,434 A | 10/1991 | Prusik et al. | 436/2 |
| 5,358,745 A | 10/1994 | Tran et al. | 427/333 |
| 5,538,642 A | 7/1996 | Solie | 210/652 |
| 5,681,467 A | 10/1997 | Solie et al. | 210/486 |
| 5,922,203 A | 7/1999 | Tomaschke | 210/500.37 |
| 6,171,497 B1 | 1/2001 | Hirose et al. | 210/500.38 |
| 6,174,439 B1 | 1/2001 | Hopkins et al. | 210/493.1 |

FOREIGN PATENT DOCUMENTS

EP    0 115 375 A2    8/1984

EP    0 451 353    10/1991

OTHER PUBLICATIONS

"Development of storage techniques for reverse osmosis membranes", Research and Development Progress Report, No. 673, National Technical Information Service, PB 202762, Apr. 1971.
N. Matsuka, et al., "Reaction kinetics of sodium bisulfite and dissolved oxygen in seawater and their applications to seawater reverse osmosis", Desalination, 51 (1984), pp. 163-171.
M. J. Hurndell, et al., "Modified poly -2-vinylimidazoline reverse osmosis membranes", Desalination 90 (1993), pp. 41-54.
M. J. Hurndell, et al., "Modified Poly -2-vinylimidazoline reverse osmosis membranes. II", Desalination 89 (1992), pp. 203-221.
Encyclopedia of Polymer Science and Engineering, Second Edition, John Wiley & Sons, vol. 2, pp. 176-192.
Toray Reverse Osmosis Elements Product Sheet for Model SU-710, pp. 1-2, Sep. 1995.
Toray Reverse Osmosis Elements Product Sheet for Model SU-810, pp. 1-2, Jan. 1996.
Hydranautics Product Sheet for Membrane Element CPA2, Feb. 14, 2001.
Hydranautics Product Sheet for Membrane Element SWCI, Mar. 16, 2001.
Technical Bulletin, FilmTec Membranes, NF40 Nanofiltrations Membrane Specifications.
Technical Bulletin, FilmTec Membranes, NF45-8040 Loose Wrap Nanofiltration Element Specifications.
Technical Bulletin, FilmTec Membranes, SR90-400 Nanofiltration Element Specifications.
J. E. Cadotte, et al., "Interfacial synthesis in the preparation of reverse osmosis membranes.", J. Macromol. Sci.—Chem., (1981) A15(5), p. 727-755.
L. H. Rowley, "A screening study of 12 biocides for potential use with cellulose acetate reverse osmosis membranes in three biocides", Desalination, 88, (1992), pp. 71-83.
L. Henthorne, et al., "Storage of thin film reverse osmosis membranes in three biocides", Membr. Technol. Conf. Proc. (1997), pp. 1059-1073, Publisher: American Water Works Associations, Denver, Colo.
*Research Disclosure*, "The Effect of pH on the Synthesis of Polyamide Membranes", No. 382, Feb. 1996, Disclosed Anonimously.
S. L. Taylor, et al., Sulfites: A Technical and Scientific Review, Nov. 1983, pp. 13-14.
E. Thomas, CRC Handbook of Food Additives, 1972, pp. 163-169. CRC Press, Cleveland, Ohio.
B. Rotter, Sulphur Dioxide, p. 5, Copyright 2001-2004.

(Continued)

*Primary Examiner*—Krishnan S. Menon

(57) ABSTRACT

A package assembly comprising a sealed water-impermeable bag enclosing: a spiral wound filtration element comprising a piperazine-based membrane, and an aqueous solution comprises a substantially non-oxidizable buffer having capacity to sequester at least 0.0025 moles per liter of hydrogen ions. The assembly preferably further includes a reducing agent. The assembly provides improved preservation for piperazine-based membranes and elements incorporating such membranes.

20 Claims, No Drawings

OTHER PUBLICATIONS

Professor W. J. Harper, Ph.D., lecture on Antimicrobial Agents given during "Food Additives" course through the Food and Science Department at Ohio State University.

W. V. Creuss, et al., Further Observations on the Relation of PH Value to Toxicity of Preservatives to Microorganisms, pp. 163-166, Jun. 28, 1931.

* cited by examiner

PACKAGE ASSEMBLY FOR PIPERAZINE-BASED MEMBRANES

BACKGROUND OF THE INVENTION

Microfiltration (MF), ultrafiltration (UF), nanofiltration (NF), and reverse osmosis (RO) are all pressure-driven separation processes allowing a broad range of neutral or ionic molecules to be removed from fluids. Microfiltration is used for removal of suspended particles greater than 0.1 microns. Ultrafiltration commonly excludes dissolved molecules greater than 5,000 molecular weight. Nanofiltration membranes have been characterized as those passing at least some salts but having high rejection of organic compounds having molecular weights greater than approximately 200 Daltons. Reverse osmosis membranes have high rejection of almost all species.

While NF and RO are both capable of excluding salts, they typically differ in selectivity. NF membranes commonly pass monovalent ions while maintaining high rejection of divalent ions. By contrast, reverse osmosis membranes are relatively impermeable to almost all ions, including sodium and chlorine ions. Still, a continuum of properties are possible, and NF membranes have sometimes been described as "loose" RO membranes.

One of the first industrially utilized membranes capable of removing dissolved salts from water was the cellulose acetate membrane developed by Loeb and Sourirajan (U.S. Pat. Nos. 3,133,132 and 3,133,137). This type of membrane is prepared by a phase inversion process resulting in an asymmetric structure. Selectivity results from a thin discriminating layer that is supported on a thicker, more porous layer of the same material. While versions of this membrane still provide adequate performance properties (flux and rejection) for some applications, cellulose acetate membranes have the noted problem of being prone to hydrolysis in either very high or very low pH solutions.

An alternative method of forming membranes capable of rejecting dissolved salts is by interfacial polymerization. This technique can result in a very thin discriminating polymer layer (commonly less than 2000 Å) supported by a layer of a chemically-different material chosen for other properties, such as strength. The thin discriminating layer can provide high selectivity while offering little resistance to flow. The interfacial polymerization is most commonly performed as a polycondensation between amines and either acid chlorides or isocyanates.

Owing to the wide variety of monomers that are available by this method, many membranes have been made with advantageous combinations of flux, rejection, and stability to high and low pH. Two of the most commercially successful of these membranes have resulted from the reaction of trimesic acid chloride (TMC) with either piperazine or meta-phenylenediamine (MPD), as described by Cadotte (U.S. Pat. No. 4,259,183 and U.S. Pat. No. 4,277,344 both of which are incorporated herein by reference). FilmTec FT30 and FilmTec NF40 are prototypical membranes made by polycondensation of TMC with MPD and piperazine, respectively. Other membranes made with piperazine or substituted piperazine have been described in the literature, e.g. see U.S. Pat. Nos. 3,687,842 and 3,696,031, with a noted advantage of stability to elevated temperature and resistance to hydrolysis at low and high pH.

Interfacial polymerization of the commercial FilmTec NF40 NF membranes was performed according to a process described in the literature, e.g. see J. E. Cadotte, R. S. King, R. J. Majerle, and R. J. Peterson, "Interfacial synthesis in the preparation of reverse osmosis membranes", J. Macromol. Sci.—Chem., A15 (5), p. 733. A polysulfone substrate was saturated with an amine solution comprising between 0.5% and 3% piperazine in water. The amine solution also contained an equal amount of N,N-dimethylpiperazine used as an acid acceptor. Excess amine was drained off or "squeezed" off by means of a rubber roller, and the polysulfone support was covered with between 0.1 and 1% TMC in freon or other suitable hydrocarbon solvent. The FilmTec commercial membranes NF45 and SR90 are still made by similar processes, with additional proprietary chemicals added to the water and/or organic phase. In each case, more than 60% of incorporated amine in the polyamide is piperazine.

A spiral-wound filter cartridge is one conventional means to incorporate large amounts of RO or NF membrane into a small volume. The construction of spiral wound elements has been described in more detail elsewhere, see for example U.S. Pat. No. 5,538,642 incorporated herein by reference. Such an element can be made by wrapping feed spacer sheets, membrane sheets, and permeate spacer sheets around a perforated permeate tube.

A membrane sheet is interposed between each feed spacer sheet and its adjacent permeate spacer sheets. The membrane sheet is oriented with the discriminating layer facing the feed spacer sheet. Often this arrangement is accomplished by folding the membrane sheet so that its discriminating layer faces in and the two sections on either side of the fold line sandwich a feed spacer sheet. Permeate and feed sides are further isolated by perimeter glue lines that bond adjacent membrane sheets on their support side and enclose each permeate sheet within a three-sided envelope. Feed solution flows axially through the feed spacer and exits on the opposite side as concentrate. Permeate solution passes under pressure through the membrane and is directed to the permeate tube by the permeate carrier sheet.

After construction, or when not in use, the spiral elements must be stored in a manner that does not harm performance of the incorporated membrane. One effective means for storing elements after manufacture is dry storage, where the water is removed in a drying stage. In many cases, dry storage results in excellent stability of performance characteristics (flux and rejection). Dry storage also has advantages in cost and in its inhibition of biogrowth. However, some dry membranes are less stable than their wet counterparts. Also dry storage does not easily allow the option of wet-testing elements prior to shipping, and testing for defective elements must then be performed by other means.

A typical method for storing wet elements before shipping is to contact elements with a preservative solution. Several different solutions have been contemplated, and some examples are described in U.S. Pat. No. 4,293,420, EU 0115375, and other publications, see for example L. H. Rowley, "A screening study of 12 biocides for potential use with cellulose acetate reverse osmosis membranes", Desalination, 88, (1992), 71–83; The nominal stability of performance properties for a given preservative is seen to vary substantially with membrane type.

A preservative based on sulfiting agents is now most commonly used for elements constructed with interfacially polymerized membrane, including both MPD-based and piperazine-based membranes. Sulfiting agents include sulfur dioxide ($SO_2$) and sulfurous acid ($H_2SO_3$), as well as inorganic sulfites such as bisulfite ($HSO_3^{-1}$), sulfite ($SO_3^{-2}$), and metabisulfite ($S_2O_5^{-2}$). Sodium bisulfite ($NaHSO_3$) is generally obtained commercially as sodium metabisulfite ($Na_2S_2O_5$); the interconversion takes place by addition of water. The distribution of sulfurous species in water depends on pH, with $H_2SO_3$ dominating at low pH. While the greatest bioactivity is usually associated with large $SO_2$ concentration, both bisulfite and sulfite are reducing agents capable of combining with oxygen. The reaction rate for removal of dissolved oxygen is greatest near neutral pH. See, for example, N. Matsuka, Y. Nakagawa, M. Kurihara, and T. Tonomura, "Reaction kinetics of sodium bisulfite and dissolved oxygen in seawater and their applications to seawater reverse osmosis", Desalination, 51 (1984), 163–171.

To maintain bioactivity, preservative solutions that react with oxygen, such as those containing sulfiting agents, must be isolated from air. When shipping an element preserved with bisulfite, the industry standard has been to enclose the element within a polymer barrier bag comprising at least one layer of polymer having low permeability to oxygen, such as SARAN. A typical bag may have a 5 mil total thickness and the better oxygen barrier bags would have a permeability of around 10 $cm^3/m^2/day$ at 68° F. Thicker barrier layers can decrease oxygen passage further, but this results in increased costs and handling problems that have not previously been justified by the demands of the application. Two liters of 1% sodium metabisulfite enclosed within a barrier bag having 0.5 square meters of surface area and an oxygen permeability of 10 $cm^3/m^2/day$ can maintain a reducing environment for more than a year. These values approximately correspond to those associated with preserving an 8" diameter spiral wound element.

Despite the long period of time that a reducing environment may be maintained at room temperature, it has been found that storage of elements in this manner can result in pronounced instability of the element's performance properties if the element is subjected to high temperatures (e.g. in excess of 100° F.) during storage. We have discovered that this is particularly the case with elements formed of piperazine-based membranes. It is a purpose of this invention to provide a storage assembly for elements formed of piperazine-based membranes capable of withstanding large excursions in temperature. A further purpose is to provide a storage assembly for such membranes that inhibits biogrowth.

SUMMARY OF THE INVENTION

The invention is directed to a method and means for packaging membrane and/or elements in a manner that maintains flow and rejection properties during storage. It is particularly concerned with the packaging of elements comprising membrane made with piperazine, such as FilmTec's NF45 nanofiltration elements.

We have discovered that membranes comprising appreciable concentrations of piperazine are surprisingly sensitive to the combination of heat and low pH. We also found that regions of low pH can be generated from some materials commonly used in the construction of spiral wound modules and the decreased pH can combine with high temperatures to degrade the properties of the piperazine-based membrane. Finally, while it has previously been recognized that an acid environment can be generated from the oxidation of standard biocide solutions, we found that the rate of this oxidation is much greater at high temperatures because of dramatic increases in permeability of standard barrier bags at high temperatures. We therefore determined that elements constructed from piperazine-based membrane are particularly sensitive to high temperature excursions when stored according to typical methods.

In one aspect, the invention is a package assembly comprising a spiral wound element having a piperazine-based membrane, a sealed water-impermeable bag enclosing the element, an aqueous solution in contact with the membrane, and a non-oxidizing buffer within the solution having capacity to sequester at least 0.0075 moles per liter of hydrogen ions. In a preferred embodiment, the aqueous solution may also contain a biostatic reducing agent that releases hydrogen ions upon oxidation. More preferably, the non-oxidizing buffer has capacity to neutralize any acid released by the reducing agent, while still maintaining capacity to sequester at least 0.0025 moles per liter of hydrogen ions. In particular, it is desired that the pH be greater than 4.0, even in the event that the reducing agent is completely oxidized. Most preferably, the pH should remain greater than 4.5.

It is also preferable that the water-impermeable bag enclosing the element has an oxygen permeability of less than 20 $cc/m^2/day$ at 68° F. More prefably, it would have a dramatically decreased permeability of less than 1 $cc/m^2/day$ at 115° F. The bag may incorporate a metal layer to achieve substantial improvements in oxygen permeabilty at elevated temperature.

It is also prefered that a high-temperature sensor that changes irreversibly in response to elevated temperatures be further incorporated into the package. This sensor may transition at a specific temperature or it may change incrementally as a function of both time and temperature.

DETAILED DESCRIPTION OF INVENTION

Interfacial polymerization has been used to make a wide variety of thin film composite membranes for RO and NF separations. This process is commonly performed as a polycondensation between amines and either acid chlorides or isocyanates. Various aliphatic, aromatic and alicyclic amines have been used. So long as they contain two or more reactive amino groups, these amines can be either monomeric or polymeric. Some of the more common amines include m-phenylenediamine, piperazine, polyethyleneimine, 1-3-5 triaminobenzene, and tris(2-diaminoethylamine). Many other examples of potential amines can be found, for instance, in U.S. Pat. No. 6,171,497. These amines can be used alone or as mixtures. The choice of monomers that contain acid chlorides or isocyanates is similarly broad. The most common monomers are trimesic acid chloride, isophthalic acid chloride, and terephthaloyl chloride. More extensive lists of potential acid chloride and isocyanate monomers, though still substantially incomplete, are provided in U.S. Pat. Nos. 6,171,497 and 5,922,203.

In the conventional process, one surface of a porous support is coated with a first reactant solution and excess solution is removed, such as by use of a nip or a drying step. The coated surface is then contacted with a second reactant solution that is insoluble in the first. One common porous support is a polysulfone micro- or ultra-filtration membrane. The support itself may be a composite membrane, and a backing material is commonly present to facilitate handling and improve mechanical properties. The first reactant solution is most commonly an aqueous solution and contains monomers or polymers with reactive amines. The second reactant solution then comprises either acid chlorides or isocyanates, and a solvent that is insoluble with water. Typical organic solvents used include alkanes, cycloalkanes, and halogen containing derivatives thereof. Additionally, either of the reactant solutions may contain other species that affect the separation properties of the membrane, such as surfactants, acid acceptors, co-solvents, and other additives. The composite membrane may also comprise a polymer coating that further affects performance properties, such as polyvinyl alcohol or sulfonated polysulfone.

Rejection of RO and NF membranes made by the above processes can vary substantially. Reverse osmosis membranes have high rejection of virtually all ions, including sodium and chlorine. Additionally, they have substantial rejection of most neutral molecules having molecular weights greater than 100 daltons. NF membranes, which are often described as "loose" RO membranes, are not fundamentally different. However, NF membranes are often characterized as those having a substantial passage of neutral molecules having molecular weights less than 200 daltons and monovalent ions. These membranes still commonly possess high rejection of divalent ions due to charge interactions. Membranes having a continuum of properties between RO and NF can be produced. In addition to high rejection of at least one species, commercially viable membranes should also possess high water permeability.

While the propensity of a composite membrane to resist chemical reaction is primarily determined by the chemical composition of its constituent polymers, including the support, the performance properties (flux and rejection) of RO and NF membranes are strongly influenced by the polymer configuration within the discriminating layer. RO and NF membranes have high water content, and the discriminating layer can be consider a gel. Swelling and de-swelling of the polymer typically increases and decreases, respectively, the permeability of both water and solutes. These changes can be brought about by drying, by heating, by prolonged soaking in water, or by large excursions in pH. In most cases, these changes are reversible, but in some cases, these tertiary changes can be essentially irreversible, even though no change to chemical composition results.

Due to the wide variety of membranes available by interfacial polymerization, several desalination membranes have been formed with desirable performance properties (flux and rejection). Some of these are also quite stable to both temperature and pH extremes. This is in contrast to early reverse osmosis membranes based on cellulose esters. In particular, membranes formed by reaction of MPD and TMC are known to be quite stable. Representative commercial literature for membranes formed with this chemistry suggests pH ranges for operation from 2 to 11 (FilmTec FT30), 3 to 10 (Hydranautics CPA), and 3 to 9 (Toray SU700/800 series). Maximum operating temperature quoted by manufacturers in the same sources were 113° F., 113° F., and 95° F., respectively. Even wider tolerances in both pH and temperature are allowed for short-term exposure, such as cleanings. The MPD/TMC chemistry is, by far, the dominant commercial practice for creating membranes for separation of ions.

The present invention relates particularly to piperazine-based membranes. For the purpose of this specification, a "piperazine-based membrane" is defined as a polyamide membrane where at least 60% of amine-containing monomers incorporated into the polymer are piperazine or piperazine derivative molecules. Examples of membrane meeting this definition have been described in the patent literature. See, for example, U.S. Pat. Nos. 3,687,842, 3,696,031, 4,259,183, 4,857,363, 4,758,343, 4,769,148, 4,859,384. See also, Cadotte, et.al, "Interfacial synthesis in the preparation of reverse osmosis membranes," J. Macromol. Sci.—Chem., A15(5), which details methods of making piperazine-based membranes by interfacial polymerization and the impact of different variations in chemistry is incorporated by reference. One typical example of a piperazine-based membrane is the FilmTec NF40 NF membrane, which has been made by contacting piperazine and TMC in the presence of an acid acceptor, N,N-dimethylpiperazine. The FilmTec commercial membranes NF45 and SR90 have been made by similar processes, with additional proprietary chemicals added to the water and/or organic phase. In each case, more than 60% of amide linkages in the polyamide are derived from the piperazine monomer. Early experiments with polypiperazine membranes found them to have "high resistance to acid and base and temperature." This assertion has been substantiated through more than a decade of commercial success. Claimed stability range for continuous operation of the FilmTec NF40 nanofiltration membrane included pH 2 to 11 with a temperature up to 113° F. The range for FilmTec NF45 nanofiltration element membrane was pH 3–10 with a maximum operating temperature of 113° F. FilmTec SR90 elements has a published range for continuous operation of pH 4–10, with a maximum operating temperature of 113° F.

While the flux and rejection of piperazine-based membranes can vary depending on both polymerization conditions and post-treatment, a particularly useful property of some membranes is the ability to selectively remove some molecules while retaining others. For example, the dairy industry has used piperazine-based membranes to concentrate large neutral molecules (whey and lactose) while removing minerals. In this application, elements commonly see daily cleaning in both acid and base. In other cases it is desired to pass monovalent salts while maintaining high rejection of divalent ions. In one application, seawater is treated before injecting the permeate into oil reservoirs to displace oil and maintain pressure. In this membrane process, osmotic pressures are minimized by passing NaCl, while formation of barium sulfate within the reservoir is prevented by rejecting sulfate ions. This application has been described in U.S. Pat. No. 4,723,603, which is incorporated by reference.

A conventional means to incorporate large amounts of RO or NF membrane into a small volume is the spiral-wound filter cartridge. The construction of spiral wound elements has been described in more detail elsewhere (see U.S. Pat. Nos. 5,538,642 and 5,681,467 incorporated herein by reference). A brief summary follows for clarification. A spiral wound element can be made by wrapping feed spacer sheets, membrane sheets, and permeate carrier sheets around a perforated permeate tube. Membrane sheets are interposed between each feed spacer sheet and its adjacent permeate spacer sheets. The membrane sheet is oriented with the discriminating layer facing the feed spacer sheet. Often this arrangement is accomplished by folding the membrane sheet so that its discriminating layer faces in and the two sections on either side of the fold line sandwich a feed spacer sheet. Permeate and feed sides are further isolated by perimeter glue lines that bond adjacent membrane sheets on their support side and enclose each permeate sheet within a three-sided envelope. Feed flows axially through the feed spacer and exits on the opposite side as concentrate. Permeate passes under pressure through the membrane and is directed to the permeate tube by the permeate carrier sheet.

After construction, elements must be stored in such a way as to minimize the change in performance properties with time. One effective means for many membranes is to store elements dry. Either before or after rolling elements, water is removed in a drying stage. Dry storage and removal of water has advantages in cost and in inhibition of biogrowth. However, some membranes change more rapidly with time in the dry state than when wet. Changes to polymer configuration (e.g. swelling or de-swelling) and oxidation of concentrated residuals may be problematic. Further, dry storage does not easily allow the option of wet-testing elements prior to shipment. An alternative to dry storage is to ship elements wet, preferably in contact with a preservative solution that limits biogrowth.

Sulfiting agents are likely the most common inhibitors of biogrowth used for storing RO and NF elements. Sulfiting agents include sulfur dioxide ($SO_2$) and sulfurous acid ($H_2SO_3$), as well as bisulfite ($HSO_3^{-1}$), sulfite ($SO_3^{-2}$), and metabisulfite ($S_2O_5^{-2}$). Sodium bisulfite ($NaHSO_3$) is generally obtained commercially as sodium metabisulfite ($Na_2S_2O_5$); the interconversion takes place by addition of water. Similarly, sulfur dioxide ($SO_2$) readily dissolves in water to produce sulfurous acid ($H_2SO_3$). These species are all in equilibrium with each other, and their relative concentrations depend on pH. Sulfurous acid ($H_2SO_3$) dominates in low pH water and sulfite ions ($SO_3^{-2}$) dominate in high pH water. The pK values relating $H_2SO_3$ to $NaHSO_3$ and $NaHSO_3$ to $Na_2SO_3$ are 1.81 and 6.91, respectively. While the greatest bioactivity is usually associated with large $H_2SO_3$ concentrations, reduction of biogrowth also results because bisulfite and sulfite are reducing agents, and they are capable of removing the oxygen from air needed for aerobic growth. Finally, the presence of these sulfiting agents further prevents discoloration of some elements, resulting from oxidation of residual chemicals in the membrane or element.

Another class of preservatives are the aldehydes, such as formaldehyde, acetaldehyde, and glutaraldehyde. Like sulfiting agents, and their selenium analogs, these can be oxidized to release hydrogen ions and lower the pH. Formaldehyde, which degrades to formic acid, had previously been one of the most commonly used element preservatives. Its use has declined dramatically since being listed as a known occupational carcinogen. Alcohols, and particularly glycols, such as ethylene and propylene glycol, have also been used to preserve elements, and these are sometimes employed in combination with sulfiting agents. Other means to preserve elements for shipping and storage have been described in U.S. Pat. Nos. 4,293,420, 6,174,439, EU 0115375 which are incorporated herein by reference.

When using a preservative that reacts with oxygen, it is necessary to isolate oxygen from the storage environment. This is most commonly done using an oxygen barrier bag. The bag may or may not be purged of oxygen prior to sealing. Bags for this purpose are typically multi-layered, incorporating a polymeric oxygen barrier layer, such as a SARAN film (a trademark of The Dow Chemical Company). An exposed layer on the inside of the bag may incorporate a low melting polymer to aid in sealing the bag. An exposed layer on the outside of the bag provides some strength and protects the oxygen barrier layer. Total film thickness is commonly a few mils, dictated by required mechanical and handling properties. The better oxygen barrier bags, in use for this application, have approximately 10 $cm^3/m^2$/day transmittance of oxygen at room temperature. Unfortunately, at higher temperatures, the polymer barrier layers increase substantially in oxygen permeability. Permeability of the barrier layer may increase by almost a factor of 50 over the range of 67 to 130° F. In addition, some barrier plastics can degrade irreversibly at higher temperatures.

Independent of the barrier material, the oxygen transmission is only as good as the seal. Sealing the bag is commonly performed by heating the open end of the bag between mandrels to a temperature sufficient to melt an inner plastic liner but less than that required to damage the bag. This seal can be particularly problematic when a vacuum is used to remove oxygen from the bag, as this process can induce wrinkles in the bag, and these wrinkles may propagate into the vicinity of the seal. Even small wrinkles can result in pathways for oxygen transmission. To some extent, this problem can be mitigated by using multiple seals or by applying additional materials to the seal area. For instance, hot melt may be applied to the outside of a seal (away from the element) using a standard glue gun.

The most common means to ship interfacially polymerized elements uses both a sulfiting agent and a polymeric oxygen barrier bag. We discovered, however, that piperazine-based membranes are surprisingly sensitive to elevated temperature when shipped and stored in this conventional manner. At high temperatures (e.g. in excess of 100° F. and low pH (e.g. lower than 4.5) performance properties of the piperazine-based membrane degrade far mare than expected. Specifically, rejection of divalent salts and larger organic molecules decreased substantially. Storage of SR90 elements for thee months at 130° F. has resulted in the passage of $MgSO_4$ changing from 1.1% to 34.3%. Without being bound to one particular theory, we propose that this is due to a combination of factors. Oxygen permeability of Saran ® bags increases at high temperatures. As the sulfiting agent reacts with oxygen, the pH drops, changing the piperazine-based membrane performance. In addition, we have found that even in the absence of sulfiting agent, acid leached from other components of the element can result in localized regions of low pH that cause degradation of the performance of the piperazine-based membranes after storage at high temperature. We have observed, further, that dry storage of elements at elevated temperatures results in poor performance of elements. (See example. 11 ), resulting in flow rates that are unacceptably low. We believe that this change is not a matter of wetting-out the polysulfone, but appears to result from changes to the polyamide configuration.

Although storage and shipping conditions are commonly not extreme, high temperatures (e.g. in excess of 100° F.) are possible. This is particularly the case when shipping and/or storing elements in warm or sunny climates such as the Middle East or other equatorial regions. Elements are commonly shipped in closed metal shipping containers, and even on a cloudy day in temperate zones, temperatures inside such containers can easily exceed 130° F. Although refrigerated shipment is an option, this alternative costs money, is not always reliable, and may pose logistical problems.

The conventional storage method exacerbates the problem. However, the pronounced sensitivity of piperazine-based membranes to the combination of heat and low pH is surprising. The stability of early piperazine-based membranes to both pH and temperature was noted at their inception. Since then, there has been more than a decade of history and applications, over a wide range of pH and temperature. Further, the greatest body of history and literature for polyamide membranes comes from those made by interfacial polymerization of MPD and TMC, and experience has indicated that the standard storage procedures are satisfactory with that membrane. From a chemical perspective, it is reasonable to expect that piperazine-based membranes would be more stable than MPD-based membrane. It is commonly agreed that the rate limiting step for acid hydrolysis of amides involves nucleophilic attack of the water molecule at the carbonyl carbon of the protonated amide to generate a tetrahedral intermediate. Comparing the transitional species associated with piperazine-based and MPD-based polyamide, the piperazine component is more electron donating than the MPD component, and it also results in a more hindered intermediate. Both factors would predict a lesser rate for acid hydrolysis for piperazine-based polyamide than for MPD-based polyamide.

Large changes in solute rejection have been observed when elements packaged according to standard procedures have been subjected to elevated temperature for a prolonged period of time. However, as applications requiring even more stringent performance requirements are developed, even small increases in solute passage (for highly rejected solutes) are unacceptable. In some cases, commercial limits on the pH range for continuous operation and the maximum operating temperature may be insufficient, but it is rare that applications simultaneously and continuously push the extreme limits of both. However, it has been found that conventional storage procedures can be expected to push these limits (and beyond) when elements are inadvertently subjected to elevated temperatures. When subjected to high temperature, standard oxygen barrier bags have greater transmission of oxygen, resulting in the accelerated oxidation of sulfiting agents and a decrease in pH. The pH of a 1% bisulfite solution can drop to as low as pH 1.6 when fully oxidized. When a maximum storage temperature can not be guaranteed, a more resilient method of packaging elements is required. Also, a means to verify the heat history of elements is desired.

It is one aspect of the present invention to allow for storage at elevated temperature by packaging elements in barrier bags with dramatically decreased oxygen transmission. The transmission of a gas, such as oxygen, depends on both permeation and leakage through the barrier, where leakage is the rate at which gas or vapor passes through defective regions, such as holes or cracks. Permeation rates are affected by humidity and temperature. For instance, polyvinyl alcohol is an excellent oxygen barrier when dry but loses its advantage when plasticized by water or exposed to high humidities. For most polymer barriers, permeation rates follow an Arrhenius type relationship, and a common rule of thumb ascribes a 30–50% permeation increase to every 5° C. rise in temperature. One excellent barrier in high humidity environments is SARAN polymer (vinylidene chloride copolymer) however this polymer has been noted to show a 25 fold increase in oxygen permeability from 68 to 122° F. While decreased transmittance of gasses can be obtained by incorporating thicker barrier layers, this approach can have negative implications for polymer processing, handling, and cost. Because current oxygen barrier bags can maintain a reducing environment for more than a year at standard conditions, improved barrier properties have not been a priority.

It has been described how increased oxygen transmission at high temperature may result in low pH for elements stored in some preservatives, particularly bisulfite. The low pH can present handling problems as well as create an environment that may result in dramatic degradation of membrane properties. One means to obtain the required dramatic change in barrier properties at high temperature is incorporation of a metal layer such as aluminum. As compared to polymers barriers that will always posses a substantially higher permeation rate for oxygen at elevated temperatures, a metal barrier layer can be virtually impermeable to oxygen. Transmission through a metal layer is generally dominated by leaks, such as pinholes or cracks. For that reason, a metalized polymer film may have greater transmission than a polymer laminate comprising a metal foil. However, both are capable of excellent oxygen rejection, and attain better than an order of magnitude decrease in permeability compared to the bags previously used.

It is another aspect of this invention to provide a means to indicate an element's exposure to a high temperature environment during storage. In particular, it is suggested spiral-wound elements have a high-temperature sensor affixed to the element that changes irreversibly in response to temperature. This temperature sensor may have a sharp transition such that it will change rapidly above a specific temperature. For example, if an opaque substance that coats a porous black backing material is melted and absorbed by the backing material, it would result in the appearance of a color change from white to black at the transition temperature. More preferably, the sensor may respond as a function of both time and temperature, such that the rate of change at elevated temperatures is greater than that at lower temperatures. Such a sensor may have a single indication of transition or it may respond incrementally. For instance, the KG061/1 Fresh-Check indicator from LifeLines (Morris Plains, N.J.) reaches complete transition after about one year at 90° F., but the label further allows rough estimation of the current status over that response range. Descriptions of some time and temperature sensitive sensors are given in U.S. Pat. No. 5,057,434 which is incorporated by reference.

It is far preferable that the high-temperature sensor be incorporated on the element, as shipping boxes and the associated contents are commonly discarded after removing the elements. Further, elements may be pre-loaded into the operating vessels before shipping them to their final destination. When a temperature sensor is incorporated on the element, it is also important that the sensor still functions after at least one week, preferably more, of operation at standard operating conditions. By "still functions" it is meant that the history of the sensor is capable of being read and the sensor does not disengage from the element. The phrase "standard operating conditions" refers to the temperatures, pressures, flows, etc., common to the element in its intended operation. Trouble shooting a filtration system can be a slow process, and the one week time frame allows the temperature sensor to be read if a problem with the elements, such as poor rejection, is discovered during operation. It is recognized that such a temperature sensor may not function for the life of the element, and, depending on the response range, may be of little use after intended high temperature excursions, such as may be done in a cleaning step. In the case of a high-temperature sensor with a sharp transition, a preferable lower limit for the transition point would be 115° F. A preferable upper limit for the transition point would be 140° F. It will be appreciated that other temperature limits may be utilized depending upon the specific membrane chemistry, application, and likely exposure conditions.

Conventional spiral-wound elements often possess an end cap and/or shell. End caps are commonly plastic pieces affixed to both ends of the element, and facilitate direction of feed, reject, and permeate paths outside the element. An element's shell is commonly formed by wrapping either resin-coated glass or tape around the element. This shell may serve to hold the leaves in place after manufacture, to protect the element during handling, and/or to provide axial strength during operation. The preferred locations of the temperature sensor include the end caps and element's shell. Both locations allow the temperature sensor to be visible to a person un-packaging and loading an element. The temperature sensor can be applied to either location after the element is built, which can be important if elements are exposed to heat during their manufacture, particularly when the temperature sensor responds rapidly to a lower transition point. Also, these two placements need not interfere with sealing mechanisms, such as might be the case by their placement on the outer surfaces of the permeate tube.

It is not sufficient to know that a specified temperature has been exceeded. In the case of piperazine-based membranes, it is more important to prevent the membrane degradation. Refrigerated storage and transportation is one means to avoid problems. However, refrigeration is not always reliable, and it may not even be an option in some cases. It is another aspect of this invention to provide a solution that protects piperazine-based elements from degradation of performance properties during storage at high temperatures. One method to protect an element from the combined effects of heat and low pH is inclusion of a buffer, such that the pH is certain to not drop below pH 4.0, more preferably below pH 4.5. In the case of bisulfite, this negatively impacts its effectiveness as a preservative, and the increased rate of reaction in air may make handling the sulfiting agent more difficult. However, even at a higher pH, sulfiting agents still maintain a reducing environment, and lack of available oxygen suppresses aerobic biological growth. In the case that the bag breaks, the buffer should ideally be capable of consuming all hydrogen ions from the reducing agent. For the same reason, the buffer should not be oxidizable by exposure to air. While inclusion of sodium sulfite, $Na_2SO_3$, can decrease the rate of membrane degradation by elevating the pH, it would be ineffective as a buffer in the long run, because it too would be eliminated by oxidation. Within this specification, a non-oxidizable buffer is one that would not generally be converted to a higher state of oxidation as a result of exposure to dissolved oxygen in water.

In the case that control of biogrowth is not required, it is reasonable to store elements wet with just water or residual testing solution. It has also been seen that, even in the absence of bisulfite, prolonged high temperature storage of wet piperazine-based elements can result in worsened salt passage. Acid has been observed to leach out of some glues used in the manufacture of elements, and this can result in localized regions of low pH in the membrane during storage. Other components of the element may similarly contribute to low pH. These problems can be mitigated by inclusion of a buffer in the storage solution. The required concentration of a buffer depends on the amount of acid that can be leached from components in an element and the area over which the acid is disseminated. It is recommended that this buffer be capable of sequestering 0.0075 moles per liter of hydrogen ions while maintaining a pH above 4. For example, approximately 0.0075 moles per liter of $Na_2HPO_4$, 1065 mg/L as the dibasic salt or 735 mg/L as the equivalent free acid, is required to sequester the same molarity of acid, resulting in a solution dominated by the monobasic $NaH_2PO_4$ salt at a pH of approximately 4.

While any non-oxidizable buffer should, in principal, mitigate problems associated with the low pH, whether derived from a preservative or from components within the element, particularly advantageous buffers would be those with a pK above 4, and preferably those with a pK above 5. The higher pK allows the buffer to be present in lower concentration and still maintain a pH above 4.0, and more preferably above 4.5. Also advantageous are those buffers that cannot promote biogrowth. Even in the absence of a preservative, biogrowth within a stored element is limited by the availability of nutrients. This is particularly the case for polyamide membranes, whereas cellulose acetate membranes are themselves a good nutrient source for biogrowth. Examples of inorganic, non-oxidizing buffers are phosphate, borate, and carbonate. The first two provide no source of carbon to support biogrowth, while the third provides minimal energy. By contrast, when not present in high enough concentration to inhibit biogrowth, buffers based on organic acids, such as acetic acid, propionic acid, or sorbic acid, can actually facilitate growth.

EXAMPLES

Example 1

Coupons of SR90 membrane were soaked for different amounts of time in sealed jars containing one of four solutions. The four solutions had pH values of 2, 3, 4.4, and 7. The pH 7 solution was de-ionized water. The pH 4.4 solution was 1% $NaHSO_3$. The pH 3 solution was made by adding $H_2SO_4$ to 1% $NaHSO_3$. The pH 2 solution was made by adding $H_2SO_4$ to de-ionized water. At four different times (two, four, eight, and sixteen weeks) coupons were removed from a jar and tested with 2000 ppm $MgSO_4$ at 70 psi applied pressure. Jars containing the remaining coupons were then filled with new solutions, and placed back in their constant temperature environments. The temperatures examined were 70, 90, 110, and 130° F. Table I shows how salt passage increases for this membrane when high temperature is combined with low pH.

TABLE I

| Weeks Soaked | Temperature (° F.) | Results at pH 7 | | Results at pH 4.4 | | Results at pH 3 | | Results at pH 2 | |
|---|---|---|---|---|---|---|---|---|---|
| | | Flux | % S.P. | Flux | % S.P. | Flux | % S.P. | Flux | % S.P. |
| 2 | 70 | 35.5 | 0.23 | 35.4 | 0.22 | 34.5 | 0.37 | 36.1 | 0.23 |
| 4 | 70 | 35.5 | 0.14 | 35.1 | 0.16 | 35.4 | 0.2 | 35.4 | 0.18 |
| 8 | 70 | 33.7 | 0.11 | 34.3 | 0.23 | 33.1 | 0.15 | 34.9 | 0.24 |
| 16 | 70 | 33.9 | 0.21 | 34.9 | 0.21 | 34.6 | 0.33 | 35.3 | 0.37 |
| 2 | 90 | 34.1 | 0.27 | 36.6 | 0.2 | 35.2 | 0.2 | 36.9 | 0.3 |
| 4 | 90 | 36.1 | 0.2 | 36.4 | 0.42 | 39.1 | 0.18 | 39.1 | 0.6 |
| 8 | 90 | 33.3 | 0.21 | 34.8 | 0.13 | 33 | 0.16 | 38.7 | 0.23 |
| 16 | 90 | 31.9 | 0.21 | 34.2 | 0.29 | 34.2 | 0.33 | 37.6 | 0.7 |
| 2 | 110 | 31.9 | 0.27 | 34.2 | 0.33 | 33.9 | 0.35 | 37.3 | 0.38 |
| 4 | 110 | 32.9 | 0.12 | 34.6 | 0.24 | 39.8 | 0.21 | 39.8 | 0.34 |
| 8 | 110 | 34.3 | 0.25 | 36 | 0.33 | 36.8 | 0.33 | 43.9 | 0.64 |
| 16 | 110 | 32.6 | 0.22 | 38.2 | 0.57 | 38.4 | 0.67 | 46.7 | 2.93 |
| 2 | 130 | 34.1 | 0.36 | 38.7 | 0.35 | 39 | 0.36 | 45.5 | 0.81 |
| 4 | 130 | 34.5 | 0.22 | 37.8 | 0.23 | 45.3 | 0.41 | 45.3 | 0.98 |

TABLE I-continued

| Weeks Soaked | Temperature (° F.) | Results at pH 7 | | Results at pH 4.4 | | Results at pH 3 | | Results at pH 2 | |
|---|---|---|---|---|---|---|---|---|---|
| | | Flux | % S.P. | Flux | % S.P. | Flux | % S.P. | Flux | % S.P. |
| 8 | 130 | 33.4 | 0.24 | 37.7 | 0.41 | 43.5 | 0.58 | 59.8 | 6.17 |
| 16 | 130 | 34.9 | 0.33 | 39.5 | 0.37 | 54.5 | 1.86 | 76.7 | 21.08 |

Example 2

Coupons were cut from NF45 and SR90 membrane and soaked in solutions having different temperature (70° or 115° F.) and acidity (pH 1, 2, or 6). The pH 6 solution was reverse osmosis water. Based on tests at 70 psi with 2000 ppm $MgSO_4$, the NF45 membrane originally had 1.4% $MgSO_4$ passage. The SR90 membrane had 0.4% $MgSO_4$ passage. Results after soaking for either two or five weeks are shown in Table II.

TABLE II

| Membrane Type | Weeks Soaked | Temperature (° F.) | Results for pH 6 | | Results for pH 2 | | Results for pH 1 | |
|---|---|---|---|---|---|---|---|---|
| | | | Flux | % S.P. | Flux | % S.P. | Flux | % S.P. |
| SR90 | 2 | 70 | 23.7 | 0.29% | 24.4 | 0.19% | 22.3 | 0.23% |
| SR90 | 2 | 115 | 28.7 | 0.24% | 31.6 | 0.18% | 41.5 | 0.85% |
| NF45 | 2 | 70 | 18.5 | 1.73% | 20.1 | 3.21% | 20.2 | 3.72% |
| NF45 | 2 | 115 | 19.7 | 1.82% | 20.4 | 1.75% | 27.5 | 8.44% |
| SR90 | 5 | 70 | 31.7 | 0.19% | 33.9 | 0.19% | 32.3 | 0.21% |
| SR90 | 5 | 115 | 27.6 | 0.14% | 27 | 0.36% | 65.6 | 39.82% |
| NF45 | 5 | 70 | 18.9 | 1.79% | 20.6 | 1.83% | 19.7 | 2.16% |
| NF45 | 5 | 115 | 18.9 | 0.97% | 23.5 | 4.13% | 49.1 | 65.01% |

TABLE III

| Temperature (° F.) | Results for pH 2 | | Results for pH 1 | |
|---|---|---|---|---|
| | Flux | % S.P. | Flux | % S.P. |
| 70 | 10.9 | 2.9% | 11.4 | 3.0% |
| 115 | 10.5 | 2.6% | 21.6 | 10.9% |
| 130 | 13.8 | 3.9% | 242 | 96% |

Example 3

A piperazine-based membrane was made by soaking a polysulfone substrate in a solution of 2% piperazine and 2% N,N-dimethylpiperazine. Excess amine was squeezed off and the support was coated with 0.2% TMC in ISOPAR L (a registered trademark of Exxon Corporation) solvent. Coupons were cut and stored at 70, 115 or 130° F. for five weeks in solutions adjusted to pH 1 or pH 2 with $H_2SO_4$. After extensive rinsing in soft water, coupons were tested at 70 psi with 2000 ppm $MgSO_4$. The same coupons stored in 70° F. water for five weeks exhibited an average flux of 11 GFD and 2.4% salt passage.

Example 4

Coupons of FT30 brackish water membrane, an MPD- (i.e. non-piperazine) based membrane, were soaked for 28 weeks in jars containing one of four solutions. The four solutions had pH values of 2, 3, 4.4, and 7, and were prepared as described in example #1. Coupons were removed from the jars and tested with 2000 ppm $MgSO_4$ at 70 psi. The average flux and salt passage values are shown in Table IV, along with the standard deviation associated with three replicate coupons.

TABLE IV

| Weeks Soaked | Temperature (° F.) | Results at pH 7 | | Results at pH 4.4 | | Results at pH 3 | | Results at pH 2 | |
|---|---|---|---|---|---|---|---|---|---|
| | | Flux | % S.P. | Flux | % S.P. | Flux | % S.P. | Flux | % S.P. |
| 28 | 70 | 13.8 (0.9) | 0.39 (0.14) | 15.3 (0.2) | 0.49 (0.09) | 15.1 (0.7) | 0.87 (0.45) | 18.5 (0.1) | 0.41 (0.22) |
| 28 | 130 | 10.3 (0.4) | 0.69 (0.43) | 10.5 (0.1) | 0.99 (0.79) | 11.1 (0.5) | 1.11 (0.48) | 13.8 (0.7) | 0.34 (0.27) |

Example 5

High temperature sensing labels were obtained from Omega (Stamford, Conn.). These were part numbers TL-S-115, TL-S-120 and 21–120, and they were designed to irreversibly change from white to black at a transition point of either 115° F. or 120° F., with an accuracy of 2%. These self-adhesive labels were applied to an end cap made of ABS polymer and placed in a rapidly stirring beaker of water for two months at room temperature. All three labels maintained their adherence and none underwent a transition indicative of elevated temperature. The end cap was then placed in a second beaker at 118° F., and the TL-S-115 label changed from white to black in about two seconds. After an hour, the end cap was then placed in a beaker at 122° F., and both the TL-S-120 and 21–120 labels transitioned from white to black in a few seconds.

Example 6

The temperature sensing labels of Example 5 and similar self-adhesive labels from Thermographic Measurements Co. Inc. (Anaheim Hills, Calif.), part number 01ETHE-115, were placed on the outside of the shell of a fiberglassed element. A temperature sensing label from Omega, TL-4-105, that indicated four transition points between 105 and 120° F. was also included in this experiment. Some of the labels were additionally fixed to the fiberglass shell by over-coating with a layer of epoxy. Within both groups, there were labels that had been placed in an oven at 125° F. before the experiment. These had already transitioned from white to black. After the epoxy dried, the shell was placed in a rapidly flowing stream of water for two weeks at room temperature. Due to the rough and irregular surface of the fiberglass shell, some of the labels faired better than others, and all of the larger four-temperature labels that were not under epoxy had released from the shell. All of the smallest labels, TL-S-115 and TL-S-120, remained adhered to the shell. All of the labels under the epoxy were still adhered to the shell, but those labels were more difficult to read. After the two weeks, the shell was placed in 125° F. water, and all remaining labels transitioned from white to black.

Example 7

The oxygen permeation through two different multi-layer barrier films was measured at 73° F. and 114° F. using a Mocon 2/60 instrument. This instrument applied standard air to one side of the film and a flowing stream of pure nitrogen to the other. After equilibration over several days, the concentration of oxygen in the nitrogen stream was measured. One film comprised a SARAN barrier sandwiched between linear low density polyethylene and nylon. Total measured oxygen transmission rate (OTR) for that bag was 11.5 $cm^3/m^2$/day at 73° F. and 54 $cm^3/m^2$/day at 114° F. The second bag comprised a metal foil layer (aluminum) sandwiched between a polyolefin and biaxial nylon. For this bag, the measured OTR was below the instrument's detection limit (0.1 $cm^3/m^2$/day) at both 73° F. and 114° F.

Both films were used in constructing oxygen barrier bags having approximately 0.07 $m^2$ of surface area. To each bag, 100 ml of a 1% sodium bisulfite solution was added. The bags were then sealed, with no attempt made to remove air from the bags first. After storage at 130° F. for 18 days, the bags were opened and the pH of solutions was measured. Solutions taken from three bags made with the film having the SARAN barrier layer averaged pH 2.25. Solutions from bags comprising the metal foil layer averaged pH 4.4. Within the measurement error, the latter value was equivalent to the initial pH of the 1% sodium bisulfite solution.

Example 8

Four SR90 elements were tested with 2000 ppm $MgSO_4$ at 70 psi. Each element was then soaked in a 1% sodium bisulfite solution having a pH value between 4 and 4.5, drained vertically for approximately 30 minutes, and sealed in a polymeric barrier bag having an oxygen transmission rate of approximately 10 $cm^3/m^2$/day. The bagged elements were then placed and sealed within a second water-impermeable bag. The second bag had high oxygen permeability, and its purpose was only to provide containment of any fluid in the event of a leak in the first bag. The four double-bagged elements were then placed in individual cardboard boxes and stored at approximately 130° F. for two months. Elements were re-tested, and results of permeate flow and salt passage are shown in Table V.

TABLE V

| Element | Before Storage at 130° F. | | After Storage at 130° F. | |
|---|---|---|---|---|
| | Flow (GPD) | % Passage | Flow (GPD) | % Passage |
| 1 | 9589 | 2.0 | 10927.2 | 13.4 |
| 2 | 10429 | 2.0 | 9836.8 | 3.1 |
| 3 | 10490 | 1.6 | 10763.0 | 8.5 |
| 4 | 10381 | 1.9 | 10245.3 | 14.5 |

Example 9

Three SR90 elements were tested with 2000 ppm $MgSO_4$ at 70 psi. Two of the three elements were bagged after testing, so that they contained only residual $MgSO_4$ test solution. The remaining element was soaked in a 1% sodium bisulfite solution and bagged. Elements were double-bagged as above, using one polymeric oxygen barrier bag, and stored in a cardboard box at about 130° F. The results of permeate flow and salt passage are shown in Table VI after storing for three months at elevated temperature. Residual preservative solution taken from the bag containing the element that had been soaked in 1% sodium bisulfite had a pH of 2.0.

It is often possible to ascertain the location of defective membrane within an element by applying a dye to the feed side of the element that strongly adsorbs to the polysulfone support. Rhodamine B is such a dye. Areas having high solute passage are visibly stained. Each element was dyed, rinsed, and cut open. As compared to membrane from elements not subjected to high temperature that appeared virtually white, membrane from the element stored in the sodium bisulfite solution was uniformly dark pink. Membrane from the two elements store in the $MgSO_4$ solution appeared white, except along the glue lines where they too were stained, particularly at the corners where the back and side glue lines meet.

TABLE VI

| | Before Storage at 130° F. | | After Storage at 130° F. | |
|---|---|---|---|---|
| Storage Solution | Flow (GPD) | % Rejection | Flow (GPD) | % Passage |
| $MgSO_4$ | 10,573 | 2.7 | 12,808 | 9.0 |
| $MgSO_4$ | 10,575 | 2.3 | 10,614 | 10.6 |
| Sodium bisulfite | 11,000 | 1.1 | 17,704 | 34.5 |

Example 10

Four dry SR90 elements were sealed in water-impermeable polymer bags and boxed. Twelve additional dry SR90 elements were tested using 2000 ppm $MgSO_4$ at 70 psi. Six of the tested elements were soaked in a pH 8.7 solution made from 1.2% $Na_2SO_4$ and 0.5% $NaHCO_3$. The remaining six elements were soaked in a pH 6.8 solution of 1% $NaHSO_4$ and 2% $Na_2HPO_4$. The twelve elements exposed to bisulfite were sealed in water-impermeable oxygen barrier bags containing an aluminum foil layer, as described in example 7. All sixteen elements were stored at 130° F. for either 3, 6, or 9 weeks. The average of results of permeate flow and salt passage for elements in each group are summarized in Table VII. The initial flow and passage in Table VII for the dry elements is based on the average of a larger group of elements that were tested at that time.

High temperature adhesive labels from Omega (Stamford, Conn.) were placed on the end caps of three of the wet elements before their first test. These stickers (Omega 21–120) were formulated to transition from white to black at a temperature of 120° F. (±2%). The three stickers were examined and removed after the second test, and all had transitioned from white to black, as expected.

TABLE VII

| Soaking Solution | Weeks in Storage | Number of elements | Average for Flow (GPD) | | | Average for $MgSO_4$ Passage | | |
|---|---|---|---|---|---|---|---|---|
| | | | First Test Flow | Final Test Flow | Change in Flow | First Test Passage | Final Test Passage | Change in Passage |
| Phosphate | 3 | 2 | 11748 | 11790 | 1% | 0.46% | 0.37% | −20% |
| Phosphate | 6 | 2 | 9867 | 10432 | 6% | 0.53% | 0.45% | −15% |
| Phosphate | 9 | 2 | 11116 | 10927 | −2% | 0.48% | 0.44% | −7% |
| Carbonate | 3 | 2 | 9624 | 10310 | 8% | 0.48% | 0.56% | 16% |
| Carbonate | 6 | 2 | 9053 | 10099 | 12% | 0.52% | 0.77% | 48% |
| Carbonate | 9 | 2 | 8532 | 9144 | 7% | 0.58% | 0.78% | 33% |
| Dry | 9 | 6 | 10020 | 4471 | −55% | 0.51% | 0.45% | −12% |

Example 11

SR90 membrane was used to construct several experimental spiral-wound elements. In this configuration, these smaller elements had flux and salt passage of approximately 130 GPD and 1% $MgSO_4$ when tested with 2000 ppm $MgSO_4$ at 70 psi. Some of the elements were stored dry. Other elements were soaked in either 1% unbuffered bisulfite, or the phosphate or carbonate buffered bisulfite solutions described in example 9. Elements were stored for either 2 or 5 weeks in a single water-impermeable bag, as indicated in Table VIII.

The invention claimed is:

1. A package assembly comprising a sealed water-impermeable bag enclosing:
   a spiral wound filtration element comprising a piperazine-based membrane in contact with an aqueous solution comprising a substantially non-oxidizable buffer in an amount sufficient to sequester at least 0.0075 moles per liter of hydrogen ions while maintaining a pH above about 4, wherein the solution further comprises at least 0.0050 moles per liter of a reducing agent that releases hydrogen ions upon oxidation, and wherein the reducing agent comprises an aldehyde, provided that the aldehyde is not formaldehyde.

2. A package assembly comprising a sealed water-impermeable bag enclosing: a spiral wound filtration element comprising a piperazine-based membrane, an aqueous buffer solution comprising a substantially non-oxidizable buffer in an amount sufficient to sequester at least 0.0075 moles per liter of hydrogen ions while maintaining a pH above 4, wherein the bag has an oxygen permeability of less than 1 $cc/m^2/day$ at 115° F.

3. The package assembly of claim 2, wherein the bag contains a metal layer.

4. A package assembly comprising a sealed water-impermeable bag enclosing:
   a spiral wound filtration element comprising a piperazine-based membrane in contact with an aqueous solution comprising a substantially non-oxidizable buffer having capacity to sequester at least 0.0075 moles per liter

TABLE VIII

| Storage Method | Temperature of Storage | Type of bag used | Weeks in Storage | Number of Elements | Flow | Passage |
|---|---|---|---|---|---|---|
| Bisulfite, not buffered | 70° F. | SARAN | 2 | 1 | 134.6 | 1.09% |
| Bisulfite, not buffered | 70° F. | SARAN | 5 | 1 | 124.2 | 0.84% |
| Bisulfite, not buffered | 160° F. | SARAN | 2 | 8 | 124.7 | 7.45% |
| Dry | 115° F. | Polyethylene | 2 | 1 | 122.1 | 0.87% |
| Dry | 130° F. | Polyethylene | 2 | 1 | 88.24 | 0.94% |
| Dry | 130° F. | Polyethylene | 5 | 2 | 79.9 | 1.05% |
| Dry | 160° F. | Polyethylene | 5 | 1 | 56.7 | 1.21% |
| Carbonate buffered | 115° F. | Metal foil | 2 | 1 | 129.9 | 1.13% |
| Carbonate buffered | 130° F. | Metal foil | 2 | 1 | 144.1 | 1.29% |
| Carbonate buffered | 160° F. | Metal foil | 5 | 1 | 166.5 | 1.01% |
| Carbonate buffered | 130° F. | Metal foil | 5 | 1 | 132.6 | 0.94% |
| Phosphate buffered | 115° F. | Metal foil | 2 | 1 | 133.5 | 1.12% |
| Phosphate buffered | 130° F. | Metal foil | 2 | 1 | 127.2 | 1.20% |
| Phosphate buffered | 160° F. | Metal foil | 5 | 1 | 134.6 | 0.88% |
| Phosphate buffered | 130° F. | Metal foil | 5 | 1 | 115.1 | 0.78% | of hydrogen ions while maintaining a pH above about 4, wherein the buffer comprises a salt of phosphoric acid.

5. A package assembly comprising a sealed water-impermeable bag enclosing:
a spiral wound filtration element comprising a piperazine-based membrane in contact with an aqueous solution comprising a substantially non-oxidizable buffer having capacity to sequester at least 0.0075 moles per liter of hydrogen ions while maintaining a pH above about 4, wherein the buffered solution contains at least 458 mg/L $HCO_3^-$ ions.

6. A package assembly comprising a sealed water-impermeable bag enclosing:
a spiral wound filtration element comprising a piperazine-based membrane, an aqueous buffer solution comprising a substantially non-oxidizable buffer having capacity to sequester at least 0.0075 moles per liter of hydrogen ions while maintaining a pH above about 4, and
a high-temperature sensor that changes irreversibly in response to elevated temperature.

7. The package assembly of claim 6, wherein said sensor indicates a response to exposure to a specified temperature in excess of 100° F.

8. The package assembly of claim 6, wherein the response of the high-temperature sensor is a function of both time and temperature, and the required time for transition decreases with increasing temperature.

9. The package assembly of claim 6, wherein the high temperature sensor responds incrementally and the response range encompasses six months at 115° F.

10. An improved method of packaging a spiral wound filtration element comprising a piperazine-based membrane wherein the filtration element is in contact with an aqueous solution of sodium bisulfite in a sealed bag, the improvement comprising:
protecting the filtration element from damage to the membrane at temperatures greater than 130° F. during storage or shipping, and in the presence of an acid, by adding to the aqueous solution a substantially non-oxidizable buffer in an amount effective to sequester at least 0.0075 moles per liter of hydrogen ions and to maintain a pH of the aqueous solution above about 4.

11. The method of claim 10, wherein the aqueous solution further comprises at least 0.0050 moles per liter of a reducing agent that releases hydrogen ions upon oxidation.

12. The method of claim 11, wherein the substantially non-oxidizable buffer within the solution is added in an amount sufficient to sequester both the hydrogen ions released by complete oxidation of the reducing agent and at least 0.0025 moles per liter of additional hydrogen ions.

13. The method of claim 11, wherein the solution maintains a pH greater than 4.5 after complete oxidation of the reducing agent.

14. The method of claim 10, wherein the bag has an oxygen permeability of less than 20 $cc/m^2$/day at 68° F.

15. The method of claim 14, wherein the bag comprises a metallized polymer film.

16. The method of claim 14, wherein the bag comprises a polymer laminate, comprising at least one polymer layer, and a layer of a metal foil laminated to at least one side of the polymer layer.

17. The method of claim 10, wherein the buffer is present at a concentration of at least 338 mg/L as an equivalent free acid of the buffer.

18. The method of claim 10, wherein the buffer comprises a salt of an acid selected from formic acid, acetic acid, propionic acid and sorbic acid.

19. The method of claim 10, whereby the spiral wound filtration element has less than 1 % salt passage, when tested using 2000 ppm MgSO4 and 70 psi applied pressure, after soaking in the aqueous solution having an initial pH of 7 and the substantially non-oxidizable buffer for 16 weeks at 130° F., and wherein said piperazine-based membrane also has greater than 5% salt passages, when tested using 2000 ppm $MgSO_4$ and 70 psi applied pressure, after soaking in the aqueous solution having an initial pH adjusted to pH 2 with $H_2SO_4$ for 16 weeks at 130° F.

20. The method of claim 10, whereby the spiral wound filtration element has less than 0.5% salt passage, when tested using 2000 ppm $MgSO_4$ and 70 psi applied pressure, after soaking in the aqueous solution having an initial pH of 7 and the substantially non-oxidizable buffer for 16 weeks at 130° F.

* * * * *